United States Patent [19]

Ishizaki

[11] Patent Number: 4,973,071
[45] Date of Patent: Nov. 27, 1990

[54] DICYCLE
[75] Inventor: Miyoji Ishizaki, Chiba, Japan
[73] Assignee: Masao Ishizaki, Chiba, Japan
[21] Appl. No.: 439,854
[22] Filed: Nov. 21, 1989

Related U.S. Application Data

[63] Continuation of Ser. No. 745,259, Jun. 14, 1985, abandoned.

[30] Foreign Application Priority Data

Jun. 19, 1984 [JP] Japan .................................. 59-19278

[51] Int. Cl.⁵ .............................................. B62K 17/00
[52] U.S. Cl. .................................... 280/208; 280/211; 280/221
[58] Field of Search ............... 280/208, 220, 221, 211, 280/205; 180/6.54; 272/70.3, 73, 114, 115

[56] References Cited

U.S. PATENT DOCUMENTS

| | | | |
|---|---|---|---|
| 3,143,362 | 8/1964 | Willsea | 280/208 |
| 3,190,675 | 6/1965 | Tang | 280/211 |
| 4,515,382 | 5/1985 | Boese | 280/221 |

FOREIGN PATENT DOCUMENTS

| | | | |
|---|---|---|---|
| 41249 | 2/1887 | Fed. Rep. of Germany | 280/208 |
| 572826 | 6/1924 | France | 280/221 |
| 1366847 | 6/1964 | France | 280/221 |
| 48-83551 | 10/1973 | Japan | 280/211 |
| 58-101887 | 6/1983 | Japan | 280/211 |
| 2049 | of 1881 | United Kingdom | 280/208 |

Primary Examiner—Charles A. Marmor
Assistant Examiner—Anne Boehler
Attorney, Agent, or Firm—Toren, McGeady & Associates

[57] ABSTRACT

A dicycle includes a pair of parallel wheels, a crankshaft to whose end portions the wheels are attached, upwardly extending control rods connected to and pivotable about the axles, and lever members which extend downwardly and contact the ground at a point which differs from the point of intersection of the vertical to the axles and the ground. When riding the dicycle, a turn can be accomplished easily by pulling a control rod and thereby raising a wheel from the ground.

7 Claims, 5 Drawing Sheets

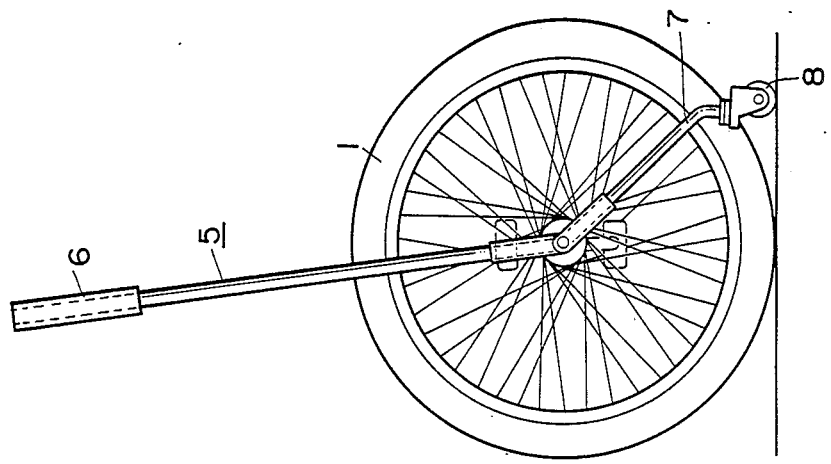
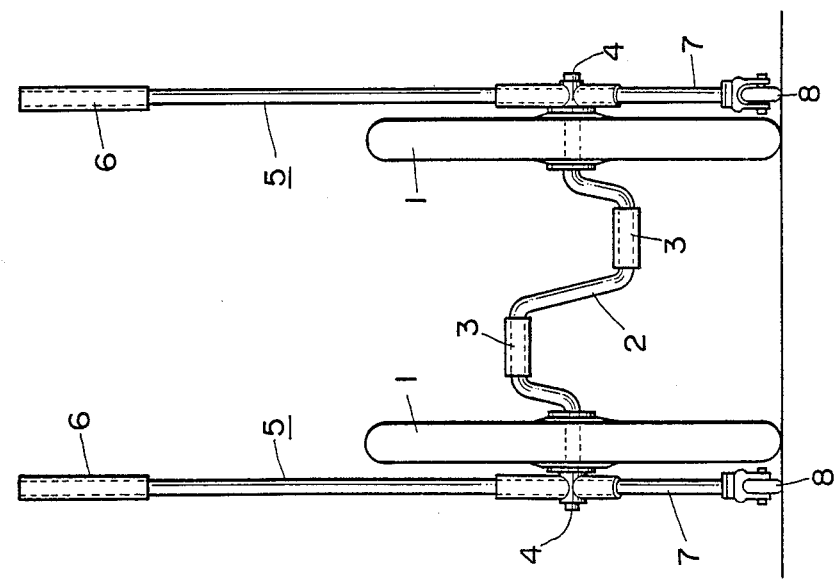

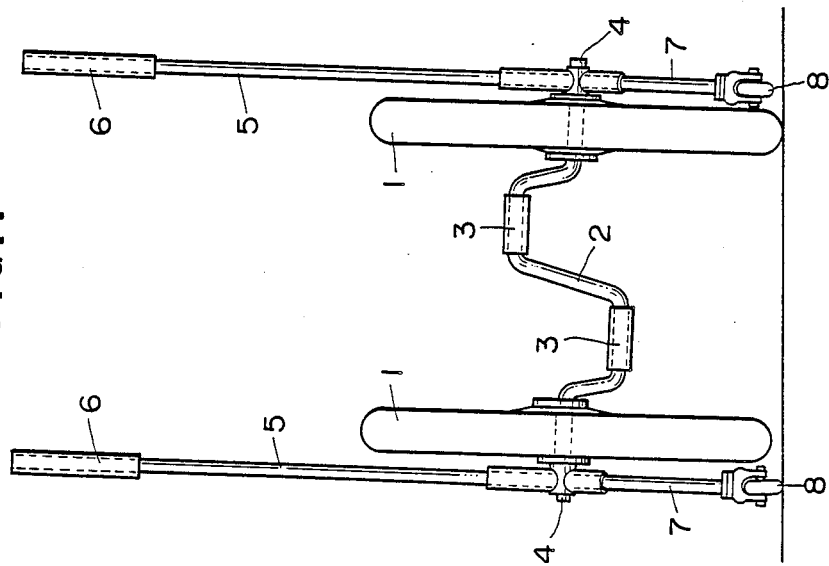
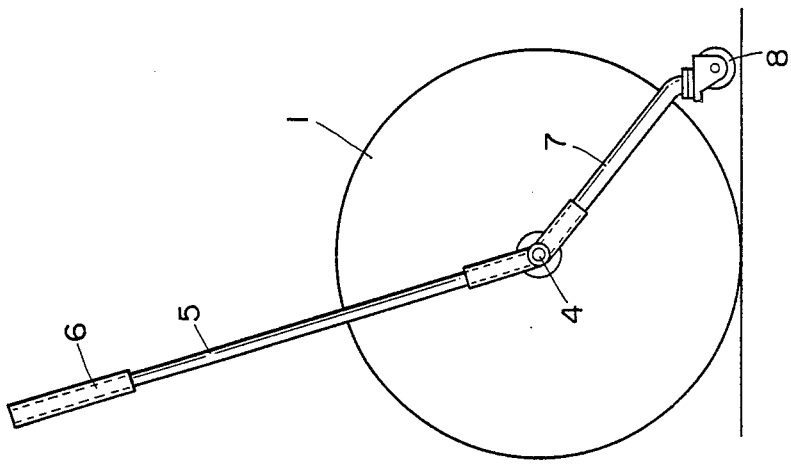

DICYCLE

This is a continuation of application Ser. No. 06/745,259 filed June 14, 1985.

BACKGROUND OF THE INVENTION

1. Field of the Invention

The present invention relates to dicycles which are used for recreation, exercise and for practical purposes.

2. Description of the Prior Art

Bicycles are widely used not only for practical purposes but also for exercise. However, since bicycles are comparatively easy to ride, strenuous exercise does not result unless one rides bicycles for a long distance. Monocycles are also used, however, they are very difficult to ride and, therefore, are not recommended for everyone, particularly for the elderly.

A dicycle requires a reasonable amount of skill and energy to operate, however, it can be used by most persons and can also be easily stopped to dismount once the skill of riding it has been acquired.

Dicycles have been known for a long time. In 1881, Otto developed a dicycle which included a pair of parallel wheels and a crankshaft provided with foot pedals. The Otto dicycle required substantial skill in operation because in order to change directions it was necessary to apply a brake. This was done by loosening a driving belt for one of the wheels and sliding a pulley. ("History of Invention, Bicycles" pp. 33–34, published by Corporation of Invention Assiciation, in Japanese).

At the present time, dicycles are not commercially available.

It is the primary object of the present invention to provide a dicycle in which the most urgent problem of dicycles, i.e., the change of direction, is solved by means of a simple structure, and which satisfactorily serves for practical purposes as well as for leisure activity and exercise.

SUMMARY OF THE INVENTION

In accordance with the present invention, a dicycle includes a pair of parallel wheels and a crankshaft provided with foot pedals. The two ends of the crankshaft form the axles of the wheels. The dicycle according to the invention further includes upwardly extending control rods which are connected to and pivot about the axles, and lever members which extend essentially downwardly and are connected to the control rods so as to pivot about the axles. The lever members are attached to the control rods in such a way that their axes intersect the ground at a point which differs from the point where the vertical line extending through the center of the axle intersects the ground. As a result, if a lever member is moved by means of a control rod, the respective wheel is raised from the ground and the wheel rotates idly.

The various features of novelty which characterize the invention are pointed out with particularity in the claims annexted to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 1 is a front elevational view of a dicycle according to the present invention, FIG. 2 is a side elevational view of the dicycle of FIG. 1, FIG. 3 is a side elevational view of the dicycle of FIG. 1 with the control rods pushed in a forward position, FIG. 4 is a front elevational view of the dicycle of FIG. 1 with a wheel raised from the ground.

DETAILED DESCRIPTION OF THE INVENTION

Figure 5:
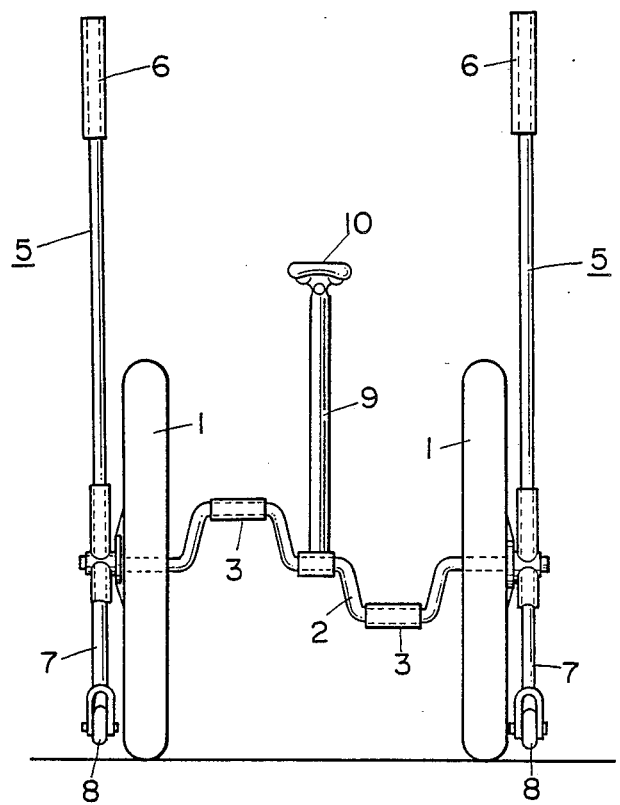
FIG. 5 is a front elevational view of a dicycle according to the present invention including a saddle.

As illustrated in the drawing the dicycle according to the present invention includes parallel wheels 1, a crankshaft 2 and pedals 3 which are supported by the crankshaft in a freely rotatable manner. Wheels 1 are attached to and rotate with crankshaft 2, both ends of which serve as axles 4 for wheels 1. Connected to and pivotable about the axles 4 are generally upwardly extending control rods 5 which include grip members 6 at their upper ends, and generally downwardly extending lever members 7. As illustrated in FIG. 1, the control rods 5 are mounted on the outside of wheels 1, however, the control rods may also be mounted on the inside of the wheels. As shown in FIG. 2, the control rod 5 and the lever member 7 include an obtuse angle. However, the control rod 5 and lever member 7 may be aligned in a straight line or may be curved. In other words, any chosen shape is acceptable as long as the bottom end of the lever member 7 touches the ground either in front of or behind the point of intersection of the vertical line through the axle 4 and the ground.

Castors 8 are be attached to the bottom ends of lever members 7. Small plate-shaped members may be substituted for the castors. Other means than castors or plates may be used as long as they act to raise the wheels and are capable of sliding on the ground in any direction.

FIG. 5 shows a further development of the present invention in which a leg member 9 is attached to the center of the crankshaft 2 and a saddle 10 is mounted on the top of the leg member 9.

The dicycle in accordance with the present invention is mounted when in the position illustrated in FIGS. 1 and 2, i.e., the wheels and the bottom ends of the lever members are on the ground. After mounting the dicycle, the rider pushes the control rods 5 forward in order to raise the bottom ends of the lever members 7 off the ground, as illustrated in FIG. 3. In this position, the dicycle can be ridden without difficulty, can be used to go up a hill or to go backwards.

In order to change directions, the following procedure is followed. To turn left, the rider pulls the left control rod 5 fairly strongly. Lever member 7 makes contact with the ground and the left wheel 1 is raised from the ground and rotates idly, as shown in FIG. 4. The right wheel 1 remains on the ground. This causes the dicycle to turn left. A right turn is accomplished in a similar manner by pulling the right control rod 5.

Figure 6:
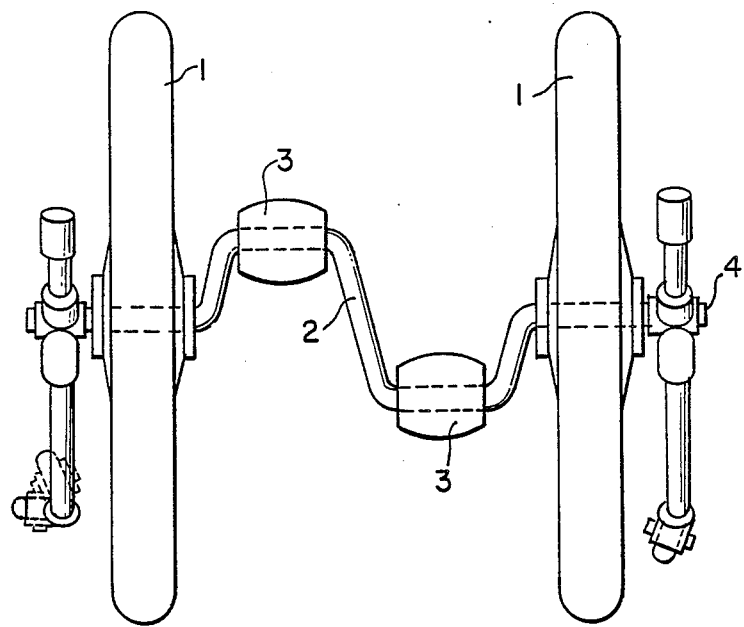
FIG. 6 is a top view of the dicycle according to the present invention.
Figure 8:
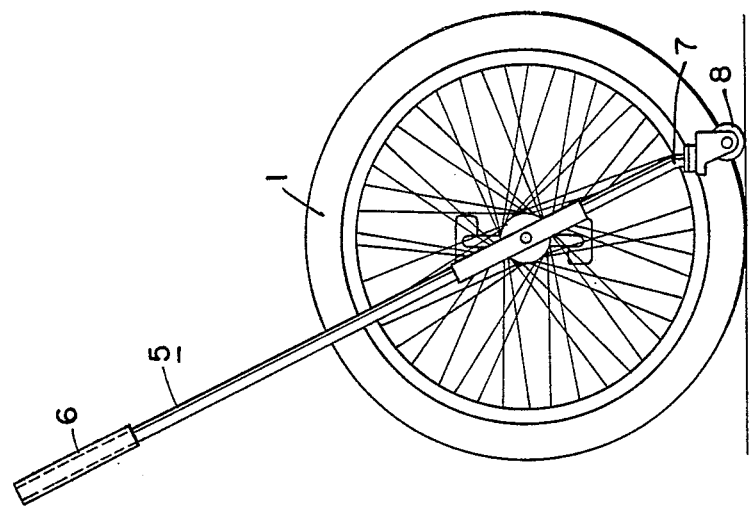
FIG. 8 is a side elevational view of the dicycle of FIG. 1 in which the control rod and lever member are aligned in a straight line.
Figure 7:
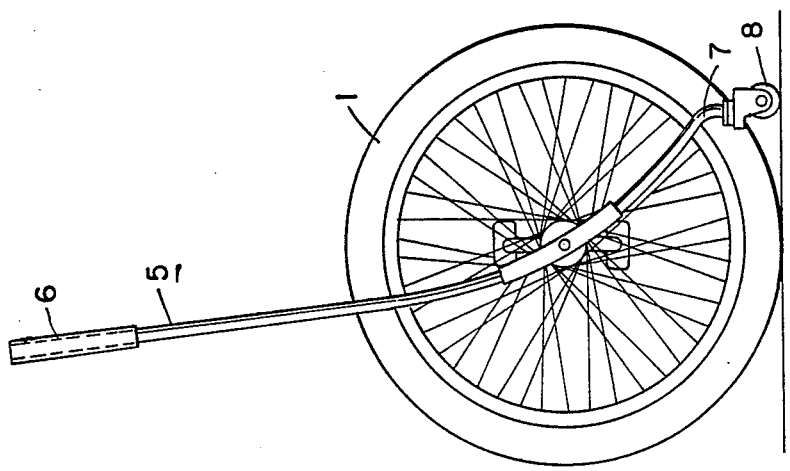
FIG. 7 is a side elevational view of the dicycle of FIG. 1 in which the control rod and lever member are curved.

FIG. 6 shows the positions assumed by castors 8 during the change of directions.

The dicycle according to the present invention is not as difficult to ride as a conventional dicycle because the change of direction while traveling is achieved by a simple operation of a control rod. The dicycle may have relatively high wheels and a detachable roof may be attached to the top ends of the control rods. The dicycle according to the invention can be used as health equipment, for leisure activities and practical purposes.

While specific embodiments of the invention have been shown and described in detail to illustrate the application of the inventive principles, it will be understood that the invention may be embodied otherwise without departing from such principles.

I claim:

1. A dicycle comprising a pair of parallel wheels, a crankshaft having coaxially extending end portions defining wheel axles, said wheels attached to said axles, a means for changing vehicle direction comprising generally upwardly extending control rods connected to and pivotable about said axles, lever members having longitudinal axes, said lever members attached to said control rods, wherein said axes of said lever members intersect the ground at a point which differs from the point of intersection of the vertical through said axle and the ground each of, said lever members being independently pivotable about said axles, whereby steering of the dicycle is effected by pulling one of said control rods, such that a bottom end of the lever member on the side of the pulled control rod touches the ground and the wheel on the side of the pulled control rod is raised from the ground and rotates idly.

2. The dicycle set forth in claim 1, comprising foot pedals mounted on and freely rotatable relative to said crankshaft.

3. The dicycle set forth in claim 1, comprising an upwardly extending leg member attached to the center of said crankshaft, and a saddle mounted on the top of said leg member.

4. The dicycle according to claim 1, wherein said control rod and said lever members include an obtuse angle.

5. The dicycle according to claim 1, wherein said control rod and said lever members are aligned in a straight line.

6. The dicycle according to claim 1, wherein said control rod and said lever members are aligned to form a curved line.

7. The dicycle according to claim 1, comprising castors attached to the bottom ends of said lever members.

* * * * *